United States Patent [19]

Shimizu et al.

[11] Patent Number: 4,820,592

[45] Date of Patent: Apr. 11, 1989

[54] PERMANENT OXIDE MAGNET AND METHOD OF COATING SAME

[75] Inventors: Motoharu Shimizu, Kumagaya; Masayoshi Minegishi, Fukaya; Nobuyuki Yamada; Kohji Kobayashi, both of Kumagaya, all of Japan

[73] Assignee: Hitachi Metals, Ltd., Japan

[21] Appl. No.: 16,747

[22] Filed: Feb. 19, 1987

[30] Foreign Application Priority Data

Feb. 10, 1987 [JP] Japan .................................. 62-28457
Feb. 24, 1986 [JP] Japan .................................. 61-38762
Mar. 28, 1986 [JP] Japan .................................. 61-69961

[51] Int. Cl.$^4$ .......................... B32B 1/00; H01F 7/02
[52] U.S. Cl. .................................. 428/692; 204/14.1; 204/34; 427/127; 427/430.1; 428/702; 428/900
[58] Field of Search ............... 428/701, 900, 405, 702, 428/692; 427/127, 430.1; 204/14.1, 34

[56] References Cited

U.S. PATENT DOCUMENTS

| 2,980,617 | 4/1961 | Ireland | 252/62.54 |
| 3,723,779 | 3/1973 | Gillum | 310/13 |
| 3,897,355 | 7/1975 | Arendt et al. | 252/62.54 |

FOREIGN PATENT DOCUMENTS 58-25497  4/1983  Japan .
58-35030  6/1983  Japan .
58-31662  7/1983  Japan .

OTHER PUBLICATIONS

J. Y. Laval et al; "Intergranular Structure and Electrical Behaviour in a Mixed Oxide-MnZn Ferrite"; Feb. 1986; pp. Cl 329–333.

IBM Specification for Part No. 5897387 entitled: "Electrophoretic Epoxy Coating System for Magnets".

Primary Examiner—Paul J. Thibodeau
Attorney, Agent, or Firm—Finnegan, Henderson, Farabow, Garrett & Dunner

[57] ABSTRACT

A permanent oxide magnet having a basic composition of $MO \cdot Fe_2O_3$, wherein M represents one or more elements selected from the group consisting of Sr, Ba and Pb, in a molar ratio of $Fe_2O_3/MO = 5.3$ to 6.2, a volume resistivity of less than $10^7$ $\Omega \cdot cm$ and a density of 4.80 $g/cm^3$ or more, the magnet being coated with an electrodeposition paint layer. Since this permanent magnet has a low resistivity, it can be well coated with an electrodeposition coating layer.

10 Claims, 5 Drawing Sheets

PERMANENT OXIDE MAGNET AND METHOD OF COATING SAME

BACKGROUND OF THE INVENTION

1. Field of the Invention

The present invention relates to a permanent oxide magnet for use in the magnetic head-positioner in rigid disk drives or floppy disk drives which are one of the peripheries for computers. More particularly, it relates to a permanent oxide magnet coated with a thin, uniform electrodeposition layer for preventing fine magnetic particles remaining on the surface as a result of working and grinding thereof from scattering, and a method for manufacturing such a magnet.

2. Description of the Prior Art

In a magnetic head-positioner in a magnetic disk apparatus, a voice coil-type motor is used as a drive source for moving a magnetic head between tracks for writing and reading information. The coil provides linear motion, (see, for instance, Japanese Patent Publication Nos. 50-4241 and 58-35030), or rotational motion (see, for instance, Japanese Patent Publication No. 58-31662). In any case, the coil is arranged in a magnetic gap defined by a yoke and a permanent magnet, or a plurality of permanent magnets, and the coil is energized by an electric current to move according to Fleming's left-hand rule.

Widely used as a permanent magent assembled in such a voice coil-type motor is, for instance, a ferrite magnet. The ferrite magnet is produced by sintering fine ferrite particles and has fine magnetic particles remaining on the surface after working or grinding thereof, so that assembling one in the above magnetic circuit without any treatment would adversely affect magnetic recording because of the scattering of such fine magnetic particles. Accordingly, the ferrite magnet for use in the above applications is generally subjected to surface coating before being assembled in the magnetic circuit.

The coating of a ferrite magnet has been conventionally carried out by spraying a paint onto the magnet surface or dipping the magnet in a paint bath. However, spraying or dipping of paint tends to cause the sagging and accumulation of the paint in the resulting paint coating, resulting in partial unevenness in thickness. In addition, if the magnet has a complicated shape, it would have some uncoated portions, or narrow gaps thereof would be clogged by the paint.

Known generally as an alternative to these painting methods is electrodeposition coating. Among the electrodepostion coating processes, cationic electrodepositon coating is highly efficient and capable of forming a uniform coating layer, so that it has been widely used for coating of automobile bodies and parts as disclosed in Japanese Patent Laid-Open No. 58-25497.

In the cationic electrodeposition coating, the body to be coated is dipped in an aqueous paint, with the body to be coated connected to a cathode (−) and a paint tank or an electrode provided in the tank to an anode (+), and DC electric current is caused to flow between the two electrodes, causing the body to be coated to attract electrically fine paint particles to form a coating film thereon. Therefore, the body to be coated is restricted to those having good conductivity such as iron and other metals. Thus, the permanent oxide magnet having electric insulating properties has not been subjected to such electrodeposition coating.

OBJECT AND SUMMARY OF THE INVENTION

An object of the present invention is, therefore, to provide a permanent oxide magnet having a thin, uniform electrodeposition surface coating.

Another object of the invention is to provide a method for providing the permanent oxide magnet with a thin, uniform electrodeposition surface coating.

Intense research in view of the above objects has revealed that the electrodeposition coating ofa permanent oxide magnet can be achieved by reducing the volume resistivity of the permanent magnet lower than a certain particular level.

Thus, the permanent oxide magnet according to the present invention is characterized by having a basic composition of $MO.Fe_2O_3$, wherein M represents one or more elements selected from the group consisting of Sr, Ba and Pb, the molar ratio of $Fe_2O_3$ to MO being 5.3 to 6.2, and further having a volume resistivity of less than $10^7$ Ω·cm and a sintering density of 4.80 g/cm$^3$ or more, the surface of the magnet being provided with an electrodeposition paint coating.

And the method for coating a permanent oxide magnet according to the present invention is characterized by dipping in a solution having a cationic electrodeposition coating paint dispersed therein the permanent oxide magnet having a basic composition of $MO.Fe_2O_3$, wherein M represents one or more elements selected from the group consisting of Sr, Ba and Pb, the molar ratio of $Fe_2O_3$ to MO being 5.3 to 6.2, and also having a volume resistivity of less than $10^7$ Ω·cm and a density of 4.80 g/cm$^3$ or more; and applying DC voltage between this permanent magnet and the opposing electrode, thereby forming a coating of the cationic electrodeposition coating paint on the surface of the magnet.

DETAILED DESCRIPTION OF THE INVENITON

The permanent oxide magnet according to the present invention has a basic composition of $MO.Fe_2O_3$, wherein M represents one or more elements selected from he group consisting of Sr, Ba and Pb, the molar ratio of $Fe_2O_3$ to MO being 5.3 to 6.2. Most preferably from the view-point of magnetic properties is a strontium ferrite magnet having as main components SrO and $Fe_2O_3$. Taking this strontium ferrite magnet for example, additives such as $SiO_2$ and CaO hav been conventionally added to the magnet to improve its magnetic properties. And to further improve and stabilize the magnetic properties, $B_2O_3$ is also added. Further added for improving its coercive force (iHc) is $Al_2O_3$ or $Cr_2O_3$. These oxide additives form a glassy grain boundary phase called a liquid phase in the resulting ferrite magnet.

As a result of intense research, the inventors have found that oxide additives such as CaO capable of forming a glassy grain boundary phase in the liquid phase during sintering of such a ferrite magnet serve to increase the electric resistivity of the ferrite magnet, making it difficult to perform electrodeposition coating thereon. It has further been found that such oxide additives affect the amount of pores remaining after a sintering process, namely the density of the sintered body.

It has been found that to form a coating layer on the surface of a ferrite magnet by means of an electrodeposition coating method, the magnet should have a volume resistivity of less than $10^7 \Omega \cdot cm$. And it has further been found that magnets having a density of 4.8 g/cm$^3$ or more would have a lower porosity, resulting in a lower volume resistivity without suffering from the decrease in magnet properties.

In order to provide ferrite magnets with a volume resistivity and a density in the above ranges, the types and amounts of oxide additives should meet the requirements as described below.

The ferrite magnet has a resistivity susceptible to wide variations depending on the types and amounts of additives and the sintering conditions, but as far as the additives are concerned, bivalent alkali earth compounds such as calcium oxide (CaO) tend to increase the resistivity of the ferrite magnet higher than $10^7$–$10^8$ $\Omega \cdot cm$ if they exist in the grain boundary.

When silicon oxide ($SiO_2$) and calcium oxide (CaO) are added, $SiO_2$ should be 0.1–1.0 weight %, CaO 0.1–1.2 weight %, and the ratio of CaO to $SiO_2$ by weight less than 1.5, to have a resistivity of less than $10^7$ $\Omega \cdot cm$.

$SiO_2$ serves to suppress grain growth, but when the amount added is less than 0.1 weight %, suppression effect cannot be obtained. On the other hand, when it exceeds 1.0 weight %, it needs the addition of a lot of CaO as a sintering accelerator, resulting in the increase in a grain boundary component which in turn reduces the magnetic properties of the resulting ferrite magnet. Accordingly, the amount of $SiO_2$ added should be 0.1 to 1.0 weight %. The preferred amount of $SiO_2$ is 0.2–0.8 weight %.

CaO serves to improve the magnetic properties of the ferrite magnet, but it tends to increase volume resistivity thereof. Specifically, when CaO is less than 0.1 weight %, substantially no effect on improving the magnetic properties can be achieved, but when it exceeds 1.2 weight %, the resistivity becomes too high, making it difficult to perform electrodeposition coating. Accordingly, CaO should be 0.1 to 1.2 weight %. Further when the ratio of CaO to $SiO_2$ by weight is 1.5 or more, the resitivity cannot be reduced to $10^7$ $\Omega \cdot cm$ or less.

The permanent oxide magnet of the present invention should have good magnetic properties in addition to the above requirements of resistivity.

First, higher magnetic properties can be achieved when the molar ratio of $Fe_2O_3$ to MO is in the range of 5.6 to 6.0.

Next, the amounts of $SiO_2$ and CaO largely affect the magnetic properties. Thus, as for $SiO_2$, it is preferably 0.2–0.8 weight % to provide higher magnetic properties. Specifically, $SiO_2$ serves to suppress the grain growth, but when it is lower than 0.2 weight %, sufficient suppression effects cannot be obtained. On the other hand, when it exceeds 0.8 weight %, it neccesitates the addition of a larger amount of CaO as a sintering aid, deteriorating the magnetic properties and increasing the resistivity of the resulting magnet.

As described above, CaO serves to enhance the magnetic properties of the resulting magnet. Specifically, when it is less than 0.5 weight %, the resulting sintered magnet does not have a sufficiently high density, resulting in low magnetic properties, and when it exceeds 1.2 weight the resistivity of the magnet becomes too high. Thus, the amount of CaO added is more preferably 0.5–1.2 weight %.

Incidentally, $B_2O_3$ serves to minimize the variation of magnetic properties which may be caused by adding $SiO_2$ and CaO, thereby stabilizing them. However, when it is less than 0.01 weight %, it cannot provide sufficient effects and when it exceeds 0.1 weight %, the sintering takes place from a too low temperature, resulting in the excessive growth of crystals which leads to the decrease in iHc. Thus, $B_2O_3$ should be 0.01 to 0.1 weight %, if any.

To enhance the magnetic properties, $Al_2O_3$ and $Cr_2O_3$ may be added. However, as the amounts of these additives increase the density of the sintered magnet becomes low, making it difficult to carry out electrodeposition coating. Thus, $Al_2O_3$ should be 1.5 weight % or less, and $Cr_2O_3$ should be 2 weight % or less.

With the above-mentioned composition, high magnetic properties such as $Br \geq 4000G$ and $iHc \geq 4000Oe$ can be achieved. With proper amounts of $Al_2O_3$ and/or $Cr_2O_3$ added to the above composition, high-iHc magnets can be obtained. On the other hand, with reduced amount of $Al_2O_3$ or $Cr_2O_3$, high-Br magnets can be obtained. Therefore, with respect to additives other than CaO and $CiO_2$, they may be added in proper amounts depending upon the required magnetic properties, as long as the resistivity is less than $10^7$ $\Omega \cdot cm$.

In addition, even with the same types and amounts of additives added, the magnetic properties may change depending upon the other factors such as pulverization conditions. Since they may be adjusted by changing the production conditions, the requirements of additives in the present invention should be taken as one preferred example.

The sintering of the permanent oxide magnet is usually carried out in the atmosphere in an electric furnace or a gas furnace, and the oxygen concentration in a highest temperature area in these furnaces is 13–18% or so for the electric furnace and 5–10% or so for the gas furnace. The resistivity of the ferrite magnet may change even with this oxygen concentration in the sintering. For instance, if the sintering is carried out in an atmosphere of a low oxygen concentration such as in a gas furnace, the reductin reaction of iron oxide ($Fe_2O_3$) proceeds to increase the amount of FeO, resulting in a lower resistivity than in sintering in a higher oxygen concentration.

Unless the magnetic properties are deteriorated, any means as mentioned above for reducing the resistivity can be employed, and a combination of some of them would ensure a low resistivity, facilitating the electrodeposition coating.

Additives for the ferrite magnet form a glassy grain boundary phase by a liquid phase sintering. Electric conduction in this grain boundary phase is usually caused by ion conduction, so when a monovalent alkali ion is contained, high ion mobility results. Accordingly, the addition of the monovalent alkali compound such as sodium oxide ($Na_2O$) and potassium oxide ($K_2O$) together with $SiO_2$, $SiO_2$-$B_2O_3$, $SiO_2$-CaO, etc. serves to reduce the resistivity of the ferrite magnet. In this case, the amount of the monovalent alkali compound is preferably 0.05-0.5 weight %. When it is less than 0.05 weight %, a sufficient effect cannot be obtained, and when it exceeds 0.5 weight %, the magnetic properties of the magnet are degraded.

The coating method according to the present invention can be carried out, for instance, by the following procedures: First the magnet to be coated is dewaxed and washed so that it has a clean surface. Further, a chemical treatment may be carried out to improve the anti-corrosion properties and adhesion of the surface coating. The magnet is then dipped in an electrodeposition bath, in which direct current is caused to flow between the magnet and the opposing electrode. The electrodeposition coating is achieved by depositing the paint particles on the surface of the magnet. Thereafter, it is washed with water, dried and then baked usually at 150°-200° C. for several tens of minutes to about one hour, so that the magnet provided with the electrodeposition coating can be obtained.

Anionic electrodeposition coating first industrialized as an electrodeposition coating method may also be carried out, using an anode deposition-type paint solution (alkaline, pH=7.5-9.0) in a solid concentration of 10-15% or so, with a matter to be coated at an anode and the paint at a cathode, at DC voltage of about 100-300 V for 2-3 minutes. The resins which may be used for the anionic electrodeposition coating are water-soluble or water-dispersible, containing a carboxyl group or a hydroxy group in molecules for having water solubility. They also contain ammonium, organic amines or inorganic alkalies for neutralization so that they are stabilized in the water. Specific examples of the resins are maleate oil resins, polybutadiene resins, acrylic resins, alkid resins, polyester resins, etc.

On the other hand, cationic electrodeposition coating may be carried out with a matter to be coated at a cathode and a paint at an anode, using, for instance, an anion deposition-type paint solution (slightly acidic, pH=5.5-7.0) in a solid concentration of 15-20% or so at DC voltage of about 100-350 V for 2-3 minutes. The resins usable as cationic electrodeposition paints contain a basic amino group; a basic onium group, etc. in molecules for making them cationic, and neutralized with acid such as a lower organic acid or an inorganic acid, so that it is water-soluble or water-dispersible. Specific examples of the resins are epoxy resins of an epichlorohydrinbisphenol A type, acrylic resins, polybutadiene resins, polyurethane resins, etc.

Incidentally, the volume resistivity (or simply resistivity) of the permanent oxide magnet according to the present invention is determined by the following procedures: First, the sintered ferrite magnet is ground to have a size of 25 mm in length, 15 mm in width and 7 mm in thickness, applied with DC voltage of 500 V at both ends of the sample in the direction of length (DC 200 V/cm) at 20° C. by using an insulation ohmmeter (TPI-512 manufactured by TAMADENSOKU) to measure the electric resistance of the magnet, and then the resistivity is calculated by the following equation:

Resistivity=Resistance×Cross Section/Length

The present invention will be explained in further detail by the following Examples, but it should been noted that the present invention is not restricted thereto.

EXAMPLE 1

Strontium carbonate ($SrCO_3$) was mixed with iron oxide ($Fe_2O_3$) in a molar ratio ($SrO/Fe_2O_3$) of 1:5.8, at 1200° C. for 2 hours and finely pulverized. In the step of pulverization, boric acid ($H_3BO_3$) was added in an amount as $B_2O_3$ of 0.05 weight % so that it could form boron trioxide ($B_2O_3$) in the step of sintering. Further, silicon oxide ($SiO_2$) in amounts of 0.2-0.5 weight % and calcium oxide (CaO) in amounts of 0-0.9 weight % were added to provide iine types of raw material powders. Each of them was finely pulverized to an average particle size of 0.8 μm by a wet-type mill, and compacted under a pressure of 0.4 t/cm² in a magnetic field of about 8 KOe. The gree bodies thus obtained for each composition were devided into two groups, and one was sintered at 1200° C. for 2 hours and the other was sintered at 1150° C. for 2 hours. Thus, 18 kinds of strontium ferrite magnets were obtained with two different sintering densities for each of the same composition.

Each of these ferrite magnets was dewaxed with alcohol, and subjected to cationic electrodeposition coating at 300 V for 3 minutes using an epoxy electrodeposition coating paint (POWERTOP U-30 Black manufactured by Nippon Paint), washed with water and dried. It was then baked at 190° C. for 1 hour. Each of the samples was tested as to whether or notthe electrodepoistion coating was formed. The results are shown in Table 1 which indicates the amounts of additives, densities of the sintered bodies, resistivity and electrodeposition results for each sample.

TABLE 1

| Sample No. | Additive (wt. %) SiO | CaO | Density (g/cm³) | Resistivity (Ω · cm) | Cationic Electrodeposition | |
|---|---|---|---|---|---|---|
| 1 | 0.2 | 0 | 4.87 | $1.7 \times 10^4$ | Yes | |
| 2 | " | 0.22 | 5.00 | $1.1 \times 10^5$ | Yes | } a |
| 3 | " | 0.34 | 5.01 | $1.3 \times 10^7$ | No | |
| 4 | 0.4 | 0.22 | 4.95 | $2.1 \times 10^4$ | Yes | |
| 5 | " | 0.45 | 4.97 | $1.8 \times 10^5$ | Yes | } b |
| 6 | " | 0.67 | 5.03 | $6.0 \times 10^7$ | No | |
| 7 | 0.5 | 0.45 | 4.96 | $5.0 \times 10^4$ | Yes | |
| 8 | " | 0.67 | 4.99 | $6.5 \times 10^5$ | Yes | } c |
| 9 | " | 0.90 | 5.04 | $8.2 \times 10^7$ | No | |
| 10 | 0.2 | 0 | 4.34 | $4.2 \times 10^6$ | Yes | |
| 11 | " | 0.22 | 4.92 | $1.1 \times 10^5$ | Yes | } d |
| 12 | " | 0.34 | 4.94 | $1.3 \times 10^7$ | No | |
| 13 | 0.4 | 0.22 | 4.86 | $1.2 \times 10^4$ | Yes | |
| 14 | " | 0.45 | 4.91 | $1.5 \times 10^5$ | Yes | } e |
| 15 | " | 0.67 | 4.95 | $4.2 \times 10^7$ | No | |
| 16 | 0.5 | 0.45 | 4.90 | $7.1 \times 10^4$ | Yes | |
| 17 | " | 0.67 | 4.92 | $2.4 \times 10^6$ | Yes | } f |
| 18 | " | 0.90 | 4.96 | $1.1 \times 10^8$ | No | |

As is evident from Table 1, the increase in resistivity makes it impossible to perform electrodeposition coating. This example shows that when the resistivity becomes $10^7$ Ω·cm or more, electrodeposition coating cannot be done on the ferrite magnet.

Figure 1:
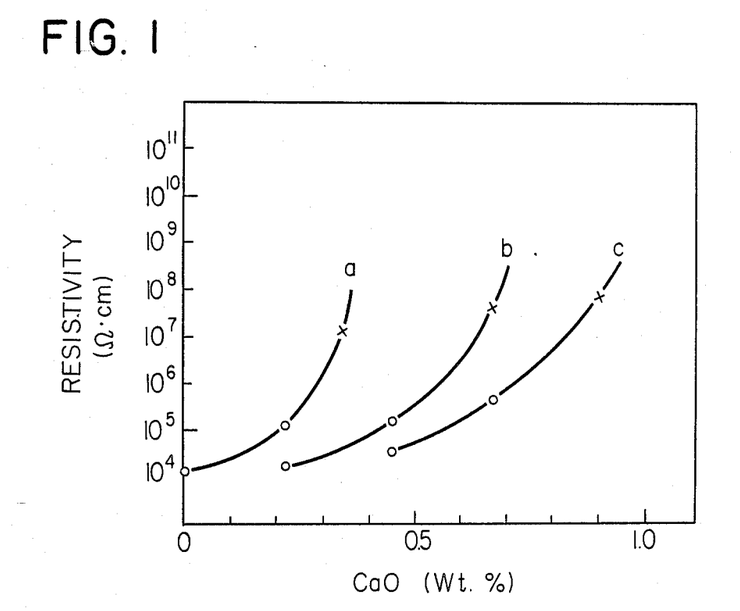
FIG. 1 is a graph showing the relation between the amount of CaO and resistivity for the ferrite magnets sintered at 1200° C.
Figure 2:
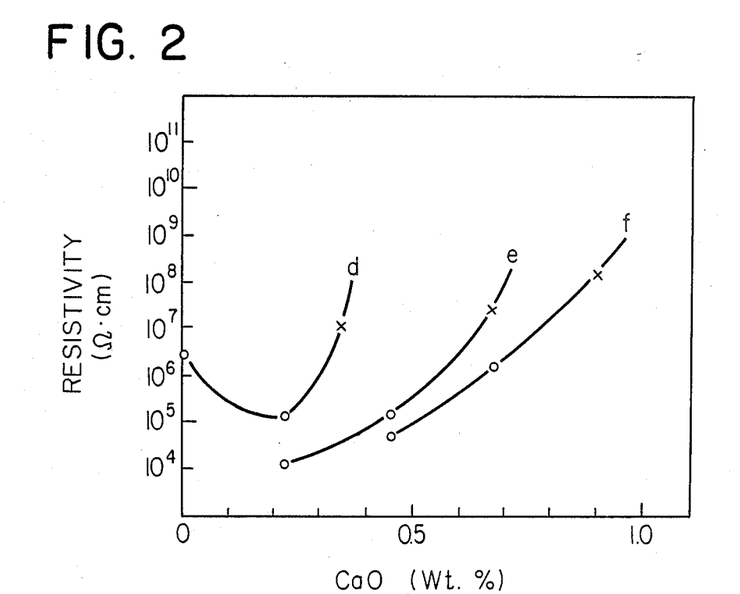
FIG. 2 is a graph showing the relations between the amount of CaO and resistivity for the ferrite magnets sintered at 1150° C.

FIG. 1 shows the relations between the amount of CaO and resistivity at a sintering temperature of 1200° C., and FIG. 2 shows the relations between the amount of CaO and resistivity at a sintering temperature of 1150° C. In the figures, the curves "a" and "d" were obtained at 0.2% $SiO_2$, the curves "b" and "e" 0.4% $SiO_2$ and the curves "c" and "f" 0.5% $SiO_2$. The residual magnetic flux density (Br) and coercive force (iHc) for each sample are shown in FIGS. 3 and 4.

As is clear from FIGS. 1 and 2, the resistivity of the ferrite magnet increases drastically with the increase in CaO which is a grain boundary component.

Incidentally, the curve "d" in FIG. 2 shows that the resistivity increases as the amount of CaO nears 0. This indicates that as the amount of CaO nears 0, the density is reduced drastically as is apparent from Table 1 which shows increasing pores existing among the grain boundaries, which in turn leads to the increase in resistivity.

Figure 3:
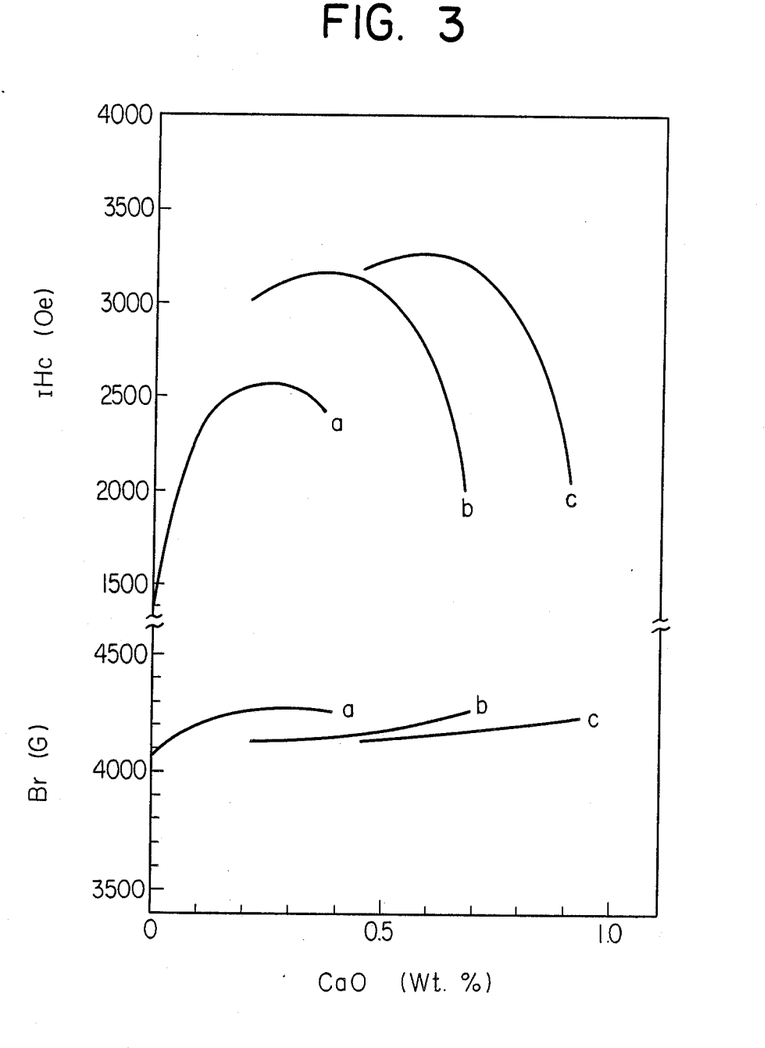
FIG. 3 is a graph showing the relations between magnetic properties and the amount of CaO for the ferrite magnets sintered at 1200° C.
Figure 4:
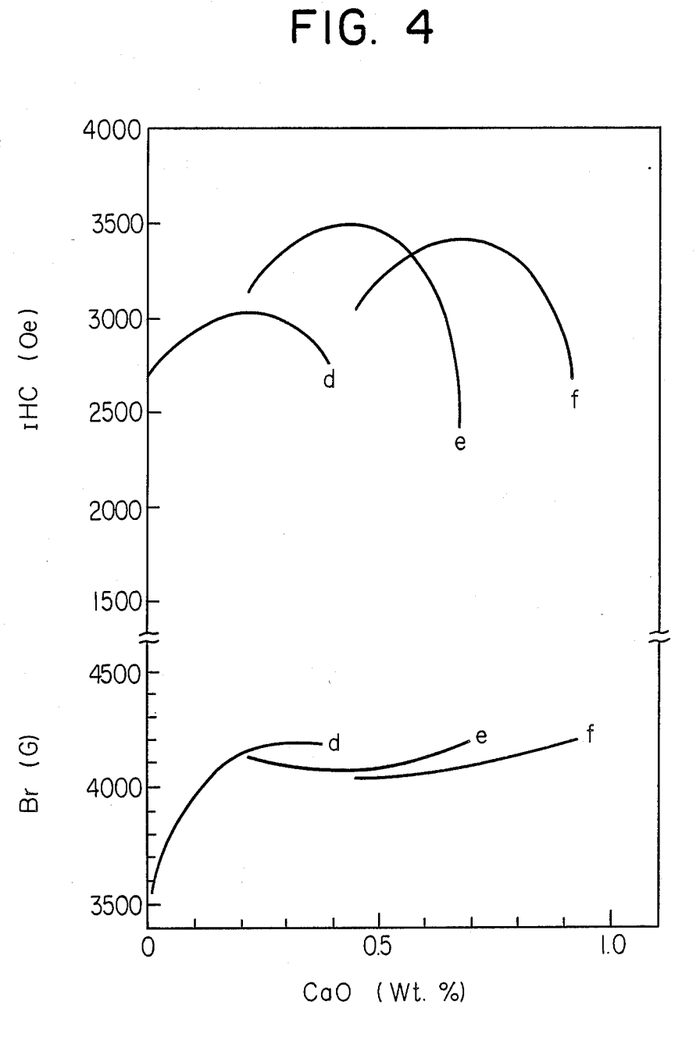
FIG. 4 is a graph showing the relations between magnetic properties and the amount of CaO for the ferrite magnets sintered at 1150° C.

FIGS. 3 and 4 show that the residual magnetic flux density (Br) and the coercive force (iHc) change depending on the amounts of additives; the more $SiO_2$, the higher the coercive force (iHc≧3000Oe), and as CaO nears a weight ratio of $CaO/SiO_2 \approx 2$, the iHc decreases rapidly. Therefore, it has been verified that the weight ratio ($CaO/SiO_2$) of 1.5 or less makes it possible to reduce electric resistance to (about $10^6$ Ω·cm or less) without deteriorating the magnetic properties, thereby facilitating the electrodeposition coating.

When CaO is not added as in the curve "d" in FIG. 2, the resistivity is $10^6$ Ω·cm or less ($4.2 \times 10^6$ Ω·cm) because the grain boundary phase does not contain CaO which serves to drastically increase resistivity, so that the electrodeposition coating can be accomplished. However, since the resulting sintered ferrite magnet had an extremely low density, its residual magnetic flux density was low (Br=3600G or less), and so was the coercive force (iHc=3000Oe or less). This seems to be because it is difficult to form the liquid phase without the addition of CaO which is a sintering accelerator, resulting in lower magnetic properties.

EXAMPLE 2

Figure 5:
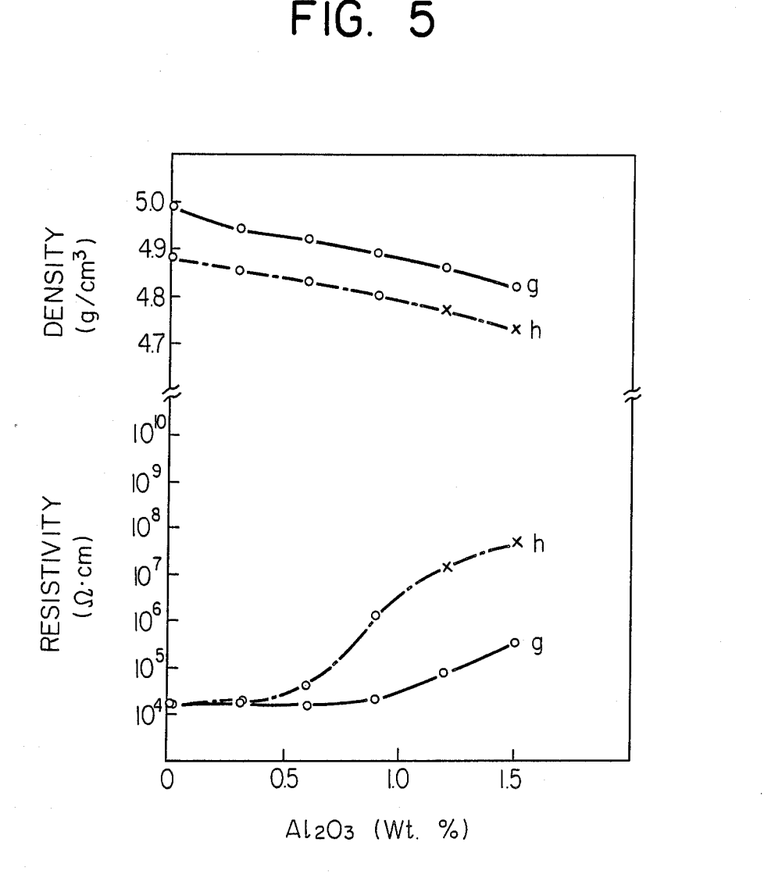
FIG. 5 is a graph showing the relations between amount of $Al_2O_3$ and resistivity and density.

$SrCO_3$ and $Fe_2O_3$ were mixed with each other in a molar ratio of 1:5.6, and further mixed with 0.2 weight % of $SiO_2$. The resulting mixture was calcinated at 1200° C. for 2 hours and finely pulverized by a wet-type mill to an average particle size of 0.8 μm while simultaneously adding 0.1% $H_3BO_3$, 0.3% $SiO_3$, 0.5% CaO and 0-1.5% $Al_2O_3$. Each of the raw material powders was formed in a magnetic field and sintered in the same manner as in Exmaple 1 to provide ferrite magnets "g." Each of these ferrite magnets was ground to a certain same size to measure its electric resistance. The results are shown in FIG. 5 which also shows the density of each sample. In the figure, the curve "g" shows the results obtained at a sintering temperature of 1200° C. and the curve "h" at 1150° C.

$Al_2O_3$ (similarly $Cr_2O_3$) is an additive for enhancing the coercive force (iHc) of the ferrite magnet, but at the same time it reduces the residual magnetic flux density (Br) and the density of the magnet. FIG. 5 shows that as the amount of $Al_2O_3$ increases, the density is lowered, and that as the density is reduced lower than 4.80 g/cm³, the resistivity increases rapidly. These samples were subjected to electrodeposition coating in the same manner as in Example 1, but those having a density of higher than 4.80 g/cm³ could be coated, but those having a lower densitycould not. Therefore, in the case of electrodeposition coating of ferrite magnets, the density thereof should be 4.80 g/cm³ or more.

EXAMPLE 3

Strontium carbonate ($SrCO_3$) and iron oxide ($Fe_2O_3$) were mixed with each other in a molar ratio (SrO/$Fe_2O_3$) of 1:5.7, and calcinated at 1200° C. for two hours. While adding 0.5 weight % silicon oxide ($SiO_2$) and 0.6 weight % calcium oxide (CaO), the mixture was finely pulverized to an average particle size of 0.8 μm by a wet-type mill, and formed under a pressure of 0.4 t/cm² in a magnetic field of 8KOe, and then sintered at various oxygen concentrations at 1200° C. for two hours to provide three kinds of strontium ferrite magnets.

Each of these ferrite magnets was subjected to cationic electrodeposition coating in the same manner as in Example 1, washed with ater, dried and then baked at 190° C. for one hour. Sintering conditions, resistivity, and the thickness of the resulting electrodeposition coating are shown for each example in Table 2.

TABLE 2

| Sintering Temp. (°C.) | Oxygen Conc. in Sintering (%) | Volume Resistivity (Ω · cm) | Thickness of Electrodeposition Coating (μm) |
|---|---|---|---|
| 1200 | 7 | $2 \times 10^5$ | 40 |
| 1200 | 17 | $5 \times 10^5$ | 36 |
| 1200 | 50 | $2 \times 10^6$ | 19 |

Table 2 indicates that the addition of 0.5 weight % $SiO_2$ and 0.6 weight % CaO with the molar ratio of $CaO/SiO_2 = 1.2$ provides the resistivity of less than $10^7$ Ω·cm which enables electrodeposition coating. It also indicates that as the oxygen concentration in the sintering atmosphere decreases, the resistivity also decreases, facilitating the formation of an electrodeposition coating layer.

COMPARATIVE EXAMPLE 1

Example 3 was repeated except for adding 0.5 weight % $SiO_2$ and 0.8 weight % CaO during the pulverization step, and the pulverization and forming were carried out in the same manner as in Example 1. Sintering was carried out at 1200° C. for two hours with different oxygen concentrations to provide two kinds of strontium ferrite magnets. The resistivities of these ferrite magnets are shown in Table 3.

TABLE 3

| Oxygen Conc. in Sintering (%) | Volume Resistivity (Ω · cm) |
|---|---|
| 7 | $2 \times 10^7$ |
| 17 | $8 \times 10^7$ |

Table 3 indicates that since these magnets too much CaO, their resistivities are higher than $10^7$ Ω·cm, so that they cannot be subjected to electrodeposition coating. Therefore, although a low oxygen concentration provides a low resistivity, the addition of a large amount of CaO ($CaO/SiO_2$ weight ratio of 1.5 or more) makes it difficult to carry out electrodeposition coating.

EXAMPLE 4

$SrCO_3$ and $Fe_2O_3$ were mixed in a molar ratio of $SrO/Fe_2O_3 = 1.5.6$, and 0.2 weight % of $SiO_2$ was added during mixing. The mixture was calcinated at 1200° C. for two hours and finely pulverized while adding 0.4 weight % $SiO_2$, 0.8 weight % CaO with or without 0.1 weight % $Na_2O$. Each of the resulting raw material powders was compacted under a pressure of 4 t/cm² in a magnetic field of 8KOe, and sintered at 1200° C. in the oxygen concentration of 20% for two hours to provide two kinds of strontium ferrite magnets. The resistivity was measured on each of the resulting ferrite magnets. The results are shown in Table 4.

TABLE 4

| $Na_2O$ (wt %) | Oxygen Conc. in Sintering (%) | Volume Resistivity ($\Omega \cdot cm$) |
| --- | --- | --- |
| 0 | 20 | $8 \times 10^5$ |
| 0.1 | 20 | $9 \times 10^4$ |

Table 4 indicates that the addition of $Na_2O$ lowers the resistivity of the ferrite magnet. This means that the addition of alkali compounds such as $Na_2O$ makes it easier to carry out electrodeposition coating on the ferrite magnet. As a result of trying electrodeposition coating on these magnets in the same manner as in Example 1, the electrodeposition coating could be made on any of the magnets because of their resistivities of less than $10^7 \Omega \cdot cm$. The thickness of the eletrodeposition coating layer was 35 μm for those containing no $Na_2O$ and 50 μm for those containing $Na_2O$.

EXAMPLE 5

Strontium carbonate ($SrCO_3$) was mixed with iron oxide ($Fe_2O_3$) in a molar ratio of $SrO/Fe_2O_3=1.5.8$, calcinated at 1150° C. and finely pulverized while adding $H_3BO_3$ in an amount of 0.05 weight % as $B_2O_3$ which was to be formed in the subsequent sintering step, and further added with 0.3 to 0.7 weight % $SiO_2$, 0.2 to 1.2 weight % CaO, 0.1–0.9 weight % SrO and 0.7 weight % $Cr_2O_3$ to provide 90 kinds of raw material powders. Each of the powders was finely pulverized to an average particle size of 0.8 μm by a wet-type mill, and compacted under a pressure of 0.4 t/cm² in a magnetic field of about 8KOe, and then sintered at 1210° C. for two hours. Thus, 90 kinds of strontium ferrite magnets were obtained.

Figure 6:
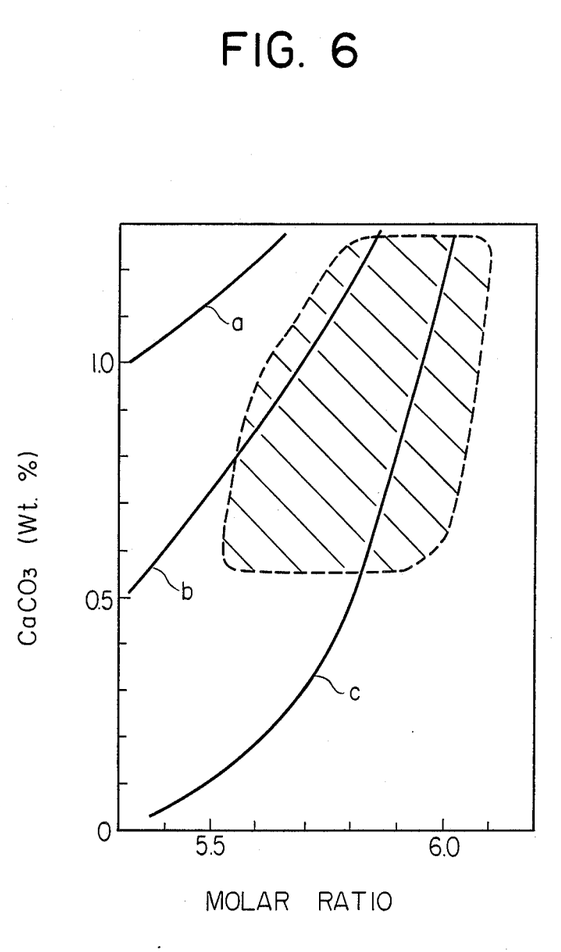
FIG. 6 is a graph showing the relations between molar ratio and the amount of CaO, and resistivity and magnetic properties.

Each of these ferrite magnets was subjected to electrodeposition coating under the same conditions as in Example 1, washed with water, dried and baked. Each sample thus obtained was measured with respect to magnetic properties and resistivity. FIG. 6 shows the relations of the amount of CaO, the molar ratio of $SrO/Fe_2O_3$, magnetic properties and a volume resistivity.

In FIG. 6, the curve "a" shows a line in which the resistivity is $1 \times 10^7$ Ω·cm when $SiO_2$ is 0.7 weight %, the curve "b" a line in which the resistivity is $1 \times 10^7$ Ω·cm when $SiO_2$ is 0.5 weight %, and the curve "c" a line in which the resistivity is $1 \times 10^7$ Ω·cm when $SiO_2$ is 0.3 weight %. In an area below each curve, a resistivity of less than $10^7$ Ω·cm can be obtained.

Also in FIG. 6, a hatched area enclosed by a dotted line shows the range in which the residual magnetic flux density Br is 4000 G or more and the coercive force iHc is 40,0Oe or more. Incidentally, this area was obtained from the measurement results in which $SiO_2$ was 0.35–0.65 weight %.

It is clear from FIG. 6 that high magnetic properties can be obtained when $SiO_2$ is in the range of about 0.3–0.7 weight %, the molar ratio of $SrO/Fe_2O_3$ is about 5.5–6.1 and CaO is about 0.5–1.2 weight %. Also under such conditions, by adjusting the molar ratio and the amounts of $SiO_2$ and CaO, the resistivity of less than $10^7$ Ω·cm can be obtained.

Incidentally, the cationic electrodeposition coating has been explained in the above Examples, but it should been noted that the anionic electrodeposition coating is also possible because the permanent oxide magnet is not dissolved to any appreciable extent in the electrodeposition solution when used as an anode material. In this case, a body to be coated is connected to an anode (+), and a electrodeposition tank or any other electrode plate is connected to a cathode (−). Therefore, the present invention is not limited to the cationic type electrodposition coating.

As described above, the permanent oxide magnet according to the present invention can be subjected to electrodeposition coating despite the fact that permanent oxide magnets are generally considered as insulating materials. For any complicated shape, an extremely thin and uniform surface coating can be provided.

What is claimed is:

1. A permanent oxide magnet having a basic composition of $MO \cdot Fe_2O_3$, where M represents one or more elements selected from the group consisting of Sr, Ba, Pb, in a molar ratio of $Fe_2O_3/MO = 5.3$ to 6.2, a volume resistivity of less than $10^7$ Ω·cm and a density of 4.80 g/cm³ or more wherein the magnet contains 0.1–1.0 weight % of $SiO_2$ and 0.1–1.2 weight % of CaO, the weight ratio of $CaO/SiO_2$ being less than 1.5, said magnet being coated with an electrodeposition paint layer.

2. The permanent oxide magnet according to claim 1, wherein said electrodeposition paint is a cationic electrodeposition paint.

3. The permanent oxide magnet according to claim 1, wherein the magnet further contains 0.05–0.5 weight % of an alkali compound.

4. The permanent oxide magnet according to claim 3, wherein the magnet further contains 0.01–0.weight % of $B_2O_3$.

5. The permanent oxide magnet according to claim 2, wherein the magnet contains 0.0–0.1 weight % of $B_2O_3$, 0.2–0.8 weight % of $SiO_2$, and 0.1–1.2 weight % of CaO.

6. The permanent oxide magnet according to claim 5, wherein the magnet further contains 1.5 weight % or less of $Al_2O_3$ and 2.0 weight % or less of $Cr_2O_3$.

7. The permanent oxide magnet according to claim 2, wherein said molar ratio is 5.6–6.0, CaO is 0.5–1.2 weight %, and $SiO_2$ is 0.2–0.8 weight %.

8. A method of coating a permanent oxide magnet having a basic composition of $MO \cdot Fe_2O_3$, wherein M represents one or more elements selected from the group consisting of Sr, Ba and Pb, in a molar ratio of $Fe_2O_3/MO = 5.3-6.2$, the method comprising the steps of:

adjusting the magnetic composition to have a volume resistivity of less than $10^7$ Ω·cm and a density of 4.80 g/cm³ or more by the addition of CaO and $SiO_2$ in the amounts 0.1–1.2 wegith % CaO, 0.1–1.0 weight % $SiO_2$, and with the weight ratio of $CaO/SiO_2$ being less than 1.5;

dipping said magnet in a solution having a cationic electrodeposition paint disposed therein; and applying a DC voltage between said magnet and the opposing electrode, thereby forming a layer of said cationic electrodedeposition paint on the surface of said magnet.

9. The method as in claim 8 wherein the adjusting step includes adding 0.05–0.5 weight % of an alkali compound.

10. The method as in claim 9 wherein the adjusting step further includes the step of adding 0.01–0.1 weight % of $B_2O_3$.

* * * * *

UNITED STATES PATENT AND TRADEMARK OFFICE
CERTIFICATE OF CORRECTION

PATENT NO. :   4,820,592

DATED      :   April 11, 1989

INVENTOR(S) :  MOTOHARU SHIMIZU ET AL

It is certified that error appears in the above-identified patent and that said Letters Patent is hereby corrected as shown below:

Claim 4, col. 10, line 32, change "0.weight" to --0.1 weight--.

Claim 5, line 35, change "0.0" to --0.01--.

Claim 8, line 53, change "wegith" to --weight--;

Claim 8, line 57, change "disposed" to --dispersed--.

Signed and Sealed this

Fourteenth Day of November, 1989

*Attest:*

JEFFREY M. SAMUELS

*Attesting Officer*    *Acting Commissioner of Patents and Trademarks*